US008660889B2

(12) United States Patent
Liesenfelt

(10) Patent No.: US 8,660,889 B2
(45) Date of Patent: Feb. 25, 2014

(54) ELECTRONIC VOTING TERMINAL AND VOTING SYSTEM

(76) Inventor: Brian T. Liesenfelt, Coconut Creek, FL (US)

( * ) Notice: Subject to any disclaimer, the term of this patent is extended or adjusted under 35 U.S.C. 154(b) by 592 days.

(21) Appl. No.: 12/503,254

(22) Filed: Jul. 15, 2009

(65) Prior Publication Data

US 2010/0017274 A1 Jan. 21, 2010

Related U.S. Application Data

(60) Provisional application No. 61/080,799, filed on Jul. 15, 2008.

(51) Int. Cl.
*G06F 11/00* (2006.01)

(52) U.S. Cl.
USPC ................................ 705/12; 705/1.1; 235/386

(58) Field of Classification Search
USPC .......................................................... 705/12
See application file for complete search history.

(56) References Cited

U.S. PATENT DOCUMENTS

| | | | | |
|---|---|---|---|---|
| 6,250,548 | B1 * | 6/2001 | McClure et al. | 235/51 |
| 2002/0019767 | A1 * | 2/2002 | Babbitt et al. | 705/12 |
| 2003/0047605 | A1 * | 3/2003 | McClure et al. | 235/386 |
| 2006/0202031 | A1 * | 9/2006 | Chung et al. | 235/386 |

FOREIGN PATENT DOCUMENTS

| | | | | |
|---|---|---|---|---|
| JP | 2006065720 A | * | 3/2006 | G07C 13/00 |

OTHER PUBLICATIONS

Biometrics and Voting (2008). http://www.giac2002.org/biometrics_and_voting.htm. Retrieved online Sep. 26, 2013.*

* cited by examiner

*Primary Examiner* — James A Reagan
(74) *Attorney, Agent, or Firm* — Assouline & Berlowe, PA; Loren Donald Pearson

(57) ABSTRACT

An electronic voting terminal includes: a display; a data input device; a biometric input device; a case having an open and a closed position, the case protecting the display, the input device, and the biometric input device in the closed position, the case making the display, input device and biometric input device accessible by the voter in the open position; a communications medium; a microprocessor to control the display, the data input device, the biometric input device, and the communications medium; and a power supply that accepts alternating current and provides direct current to the microprocessor The device utilizes the biometric input device to validate the identity of the voter, utilizes the data input device to receive the ballot from the voter, and utilizes the communications medium to transmit the ballot. A system for voting also includes a centralized computer and voter registration database.

9 Claims, 3 Drawing Sheets

FIG. 3
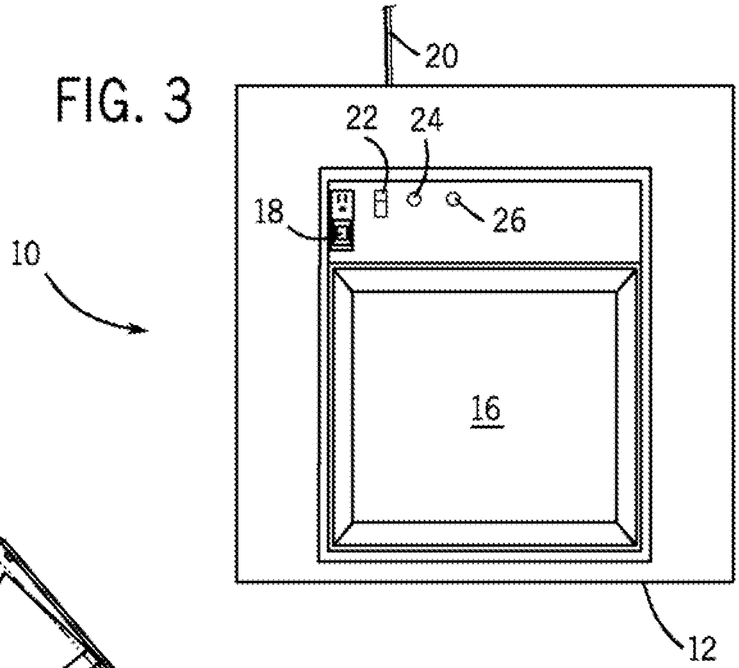
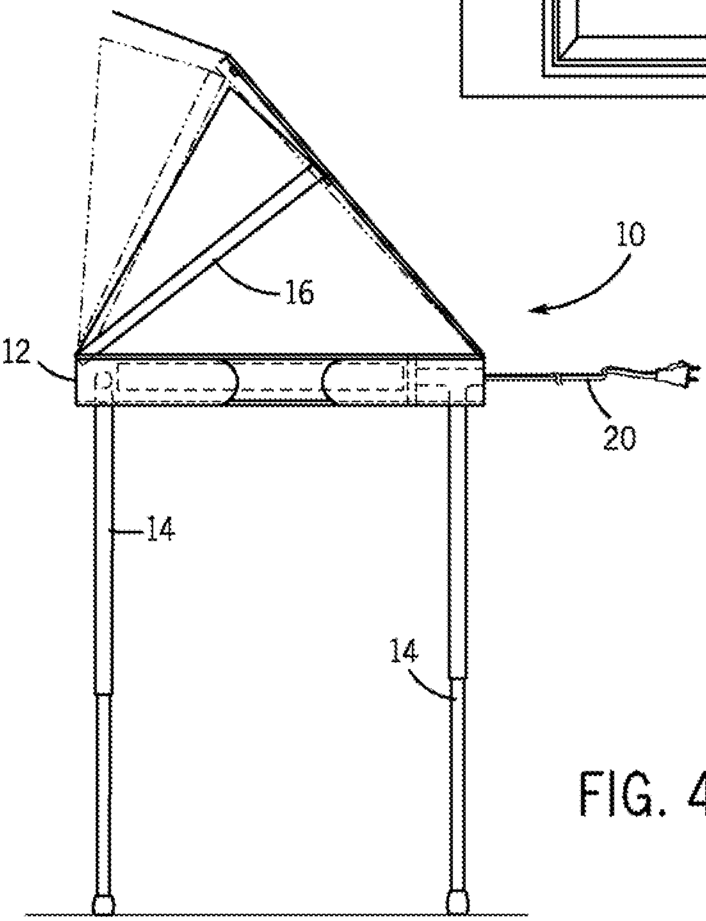
FIG. 4

ELECTRONIC VOTING TERMINAL AND VOTING SYSTEM

RELATED APPLICATIONS

The present application claims benefit of priority to U.S. Provisional Application No. 61/080,799, filed Jul. 15, 2008, which is incorporated herein by reference in its entirety.

BACKGROUND OF THE INVENTION

The present invention generally relates to information systems, and more specifically, to an electronic voting system.

Earlier electronic voting systems did not have the capability to produce a paper trail of votes cast. They did not allow for nor could they produce a voter verifiable way to insure that for each and every voter that voted, that their votes were: 1. Correctly and accurately recorded in the first place. 2. Correctly and accurately counted in the second place. 3. Verifiable by each individual voter before they left the voting location. 4. No erroneous voter induced over votes or under votes. 5. No erroneous system induced over votes or under votes. 6. No erroneous poll worker induced over votes or under votes. 7. No erroneous computer programmer induced over votes or under votes. 8. No intentionally induced over votes or under votes. 9. No accidentally or intentionally erased votes. 10. No accidentally or intentionally erased vote totals or results. 11. Absentee ballots were not mis-mailed, lost or misplaced.

No computerized electronic voting system has the capability to allow voters to vote, in a secure way, over the internet.

As can be seen, there is a need for an improved system for voting.

SUMMARY OF THE INVENTION

In one aspect of the present invention, a device for transmitting a ballot from a voter includes: a display; a data input device; a biometric input device; a case having an open and a closed position, the case protecting the display, the input device, and the biometric input device in the closed position, the case making the display, input device and biometric input device accessible by the voter in the open position; a communications medium; a microprocessor to control the display, the data input device, the biometric input device, and the communications medium; and a power supply that accepts alternating current and provides direct current to the microprocessor; wherein the device utilizes the biometric input device to validate the identity of the voter, utilizes the data input device to receive the ballot from the voter, and utilizes the communications medium to transmit the ballot.

In another aspect of the present invention, a system for voting includes: a secure computer having a database containing voter registration information; a data communications network; and a plurality of voting terminals, each voting terminal including a biometric input device, each voting terminal in communication with the secure computer utilizing the network; wherein each voting terminal validates the identify of a voter utilizing the biometric input device and the database, accepts a ballot from the voter, and transmits the ballot to the database over the network; and the secure computer tallies the ballots in the database.

In yet another aspect of the present invention, a method for voting includes: providing a voting terminal; providing a centralized database; verifying a voter's identity utilizing the voting terminal and the database; receiving ballot information from the voter utilizing the voting terminal; and communicating ballot information between the voting terminal and database.

These and other features, aspects and advantages of the present invention will become better understood with reference to the following drawings, description and claims.

BRIEF DESCRIPTION OF THE DRAWINGS

FIG. 3 depicts a top plan view of an embodiment of a voting terminal according to the present invention;

FIG. 4 depicts a side elevational view of an embodiment of a voting terminal according to the present invention in the use position;

DETAILED DESCRIPTION OF THE INVENTION

Figure 1:
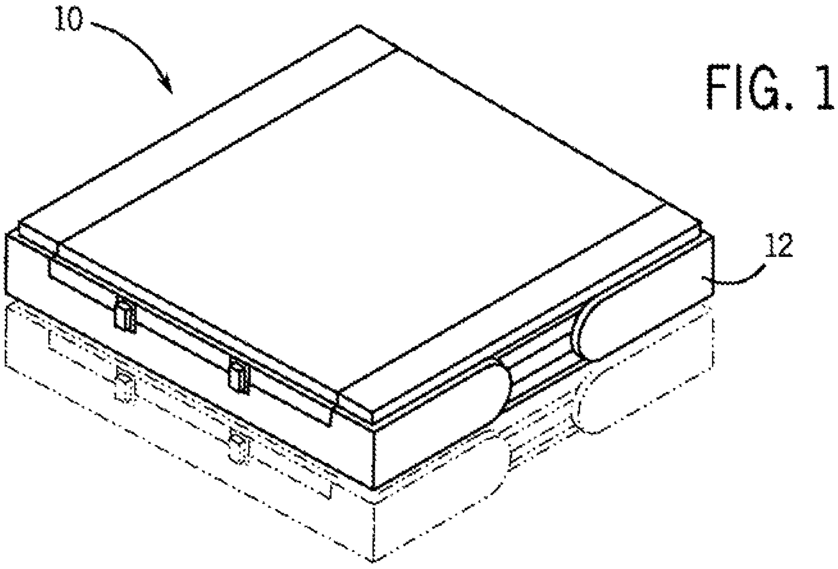
FIG. 1 depicts a perspective view of an embodiment of a voting terminal according to the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally provides an electronic voting system. Embodiments include a voter database identification system, a voter identification verification system, a voter election system, and an election verification system. Embodiments may be called "Voter ID Election Verification System" or "VideVs."

An embodiment of the present invention is an end to end computerized electronic voting system including a central computerized voter registration database, a wide area network (WAN) data communications network and electronic voting terminals housed in compact lightweight cases that also function as convenient stands for the voting terminals. An embodiment is an improvement to existing computerized electronic or paper based voting systems in use today. An embodiment addresses the present systems' deficiencies in a way that allows for a voter verified paper trail, multiple same ballot re-voting, a paper audit trail, 'same way' legal recounts, secure internet absentee voting and Help America Vote Act (HAVA) compliant voting. This can be without the need for paper ballots, optical scanners, terminal printers, mailed absentee ballots and voter photo ID's, while maintaining the integrity of the secret ballot.

An embodiment of the present invention is a voting system with four main functions: a voter registration database/ID system, a voter ID verification system, a voter election system, and an election verification system.

Embodiments of the present invention may include the following:

A centrally located secure mainframe computer. This may be located at the local County Supervisor of Elections (SOE) office. On this mainframe or other computer is stored, in a machine readable format, the complete voter registration database of voter information. This mainframe computer is also used during elections to store and distribute all the various web based ballot pages for the voters to vote on. This mainframe computer also stores the complete voting record of every vote and ballot cast using this VideVs system. It is also used to store and tally votes and vote totals for election results. The computer is referenced herein as a "mainframe" in that it is a sufficiently powerful computer platform to perform these operations.

A computerized voter registration database. This database is also on the mainframe computer in a machine readable format. This is a database of all registered voters and voter specific information (VSI) such as names, addresses, party, age, race, etc., and other demographic information as mandated by law and the SOE office. Also stored in this database is a voting record of votes cast or left blank, using this VideVs voting system, by every voter. Two live real time copies of this database are directly connected to the mainframe computer and a third and forth off line duplicate copies serve as backups one on site, one off site for security reasons.

A county wide area network (WAN) data communications network. This may be a county network system of hardwired landlines, fiber optic cables and or wireless backbones or any combination of these as used by the county to communicate with and conduct county related day to day business with all public access county buildings and locations throughout the county. This may include buildings such as schools, libraries, courthouses, county government offices, parks and recreation centers, police and fire stations, etc.

Voting terminals. These voting terminals are located throughout the county at WAN connected public access locations, voting centers, etc.

As depicted in FIGS. 1, 2, 3 and 4, embodiments of a voting terminal 10 may include the following.

A storage/carrying case 12. As seen in FIG. 1, the cases 12 have an inter-locking design which makes them stackable. Each inter-locking design stackable case is of suitable size to house all the internal components. It can be larger or smaller as needed but in a preferred embodiment, each case may be approximately 24"×24"×3" (L×W×H) when closed up as depicted in FIG. 1. It may be made of a durable lightweight high strength plastic material. Any number of materials can be used for this but a preferred material may be injection molded high density nylon or HDPE plastic.

Four integrated telescoping aluminum, or similar strength lightweight material, legs 14 of one basic design. The four legs 14 fold up inside the bottom of the case such that the two front legs become convenient side carrying handles. Each case, when opened for voting, can also sit flat on a table to allow easy access for voting by handicapped or wheelchair voters.

An integrated AC/DC power supply provides a convenient AC outlet for another voting terminal, as depicted in FIG. 3. An embodiment includes a power supply to power all internal electric components plus two power "good" indicator lights: an amber "AC Good" light 24 for alternating current and a green "DC Good" light 26 for direct current.

A flat panel LCD display screen 16.

Three folding privacy screens that fold up to help cover and protect the LCD display screen when not in use, as depicted in FIG. 4.

Figure 5:
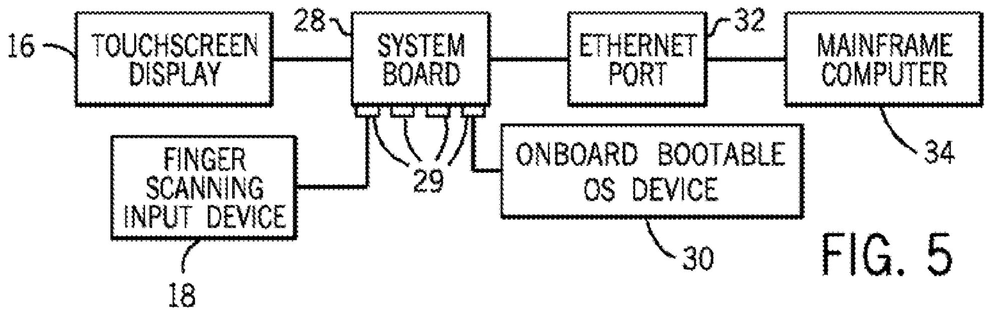
FIG. 5 is a block diagram of an embodiment of a voting system according to the present invention.

A microprocessor controlled electronic system board 28 similar in form and function to those found in laptop style computers, as depicted in FIG. 5, with the following integrated parts: four USB ports 29; a high speed Ethernet communications port 32 used for data communications with the mainframe computer 34; a bootable solid state (USB) storage device 30 with a preloaded machine readable microcode program for the initial system startup, operating system, display system, biometric finger scanner, and data communications with the mainframe computer. In an embodiment, no votes, vote totals, or voter information need be stored in the voting terminal, so that no direct recording electronic (DRE) is required.

Electrical interconnection cables for data, signal and power, between the system board 28, the display device 16, the finger scanner 18 and the voter controlled input device.

A network data communications cable. In an embodiment, Ethernet is the preferred communications medium between the voting terminal and the mainframe computer.

A voter controlled input selection device. This can be combined with the display to produce a touch screen display 16. Other embodiments use a tethered stylus, a tethered mouse, a wireless mouse, a wireless stylus, a touch pad or any number of alternative input selection devices that can be controlled by the voter.

An AC power cord 20.

A biometric identification (ID) input device 18. As depicted in FIG. 3, the preferred method used is a finger scanning input device 18 that can be integrated into the voting terminal or located external to it but still inside the carrying case and hardwired into the terminal.

An embodiment of a voting terminal 10 may weigh approximately 8 lbs. when fully assembled with case 12, telescoping folding legs 14, a power supply, an AC electric cable 20, an Ethernet data communications cable or port 32, a biometric input device 18 and a touchscreen 16 or other voter controlled input selection device (not shown).

It should be further noted that any suitable combination of similar form and function components can be substituted and or used in place of the preferred ones listed herein as long as they provide for the same basic operation and function as those listed here. Many such similar components would come to mind of anyone skilled in the art and would be suitable substitutes for those described herein.

Figure 2:
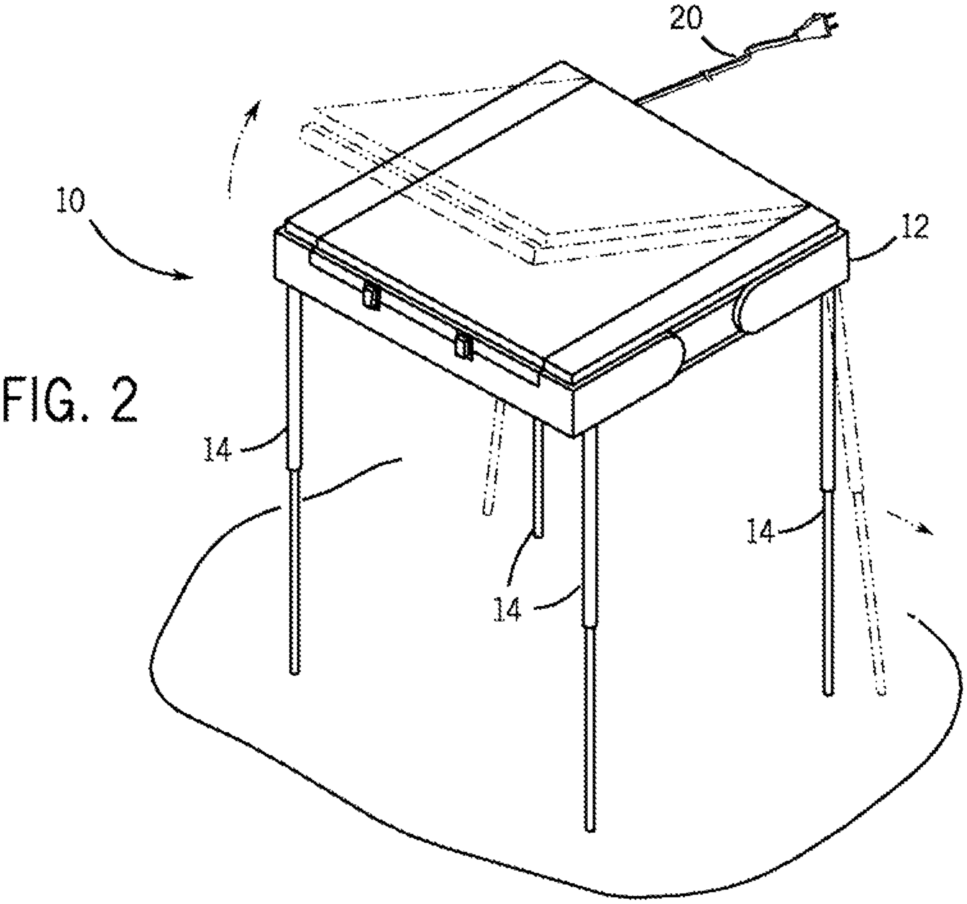
FIG. 2 depicts a perspective view of an embodiment of a voting terminal according to the present invention with legs extended.

In an embodiment, basic operation of the present invention is as follows. The terminals are setup as depicted in FIGS. 2 and 4 in County government public access buildings, libraries, schools, parks, courthouses, etc., and other county network WAN connected public access buildings, voting centers and or precincts. Each terminal 10 is network connected through the county network/backbone back to a central computer 34 at the Supervisor of Elections (SOE) voting center.

In an embodiment, each terminal's internal hardware MAC address is pre-loaded into the network operating system (OS) that runs on the mainframe computer. Each machine MAC address becomes a valid user ID. Only these preloaded valid user ID's are allowed to login into the voting network. At power up each voting terminal runs a pre loaded machine readable microcode program that is stored on the internal USB boot device 30. This initiates all internal devices, the display system 16; the voter controlled input selection device, and the biometric ID device 18. It also initiates the network login and data communications to the mainframe computer. The terminal 10 then automatically logs into the network utilizing its internal hardware MAC address as a valid user ID. After the terminal establishes communications with the Supervisor of Elections mainframe computer it is now ready for voters to vote on it.

Figure 6:
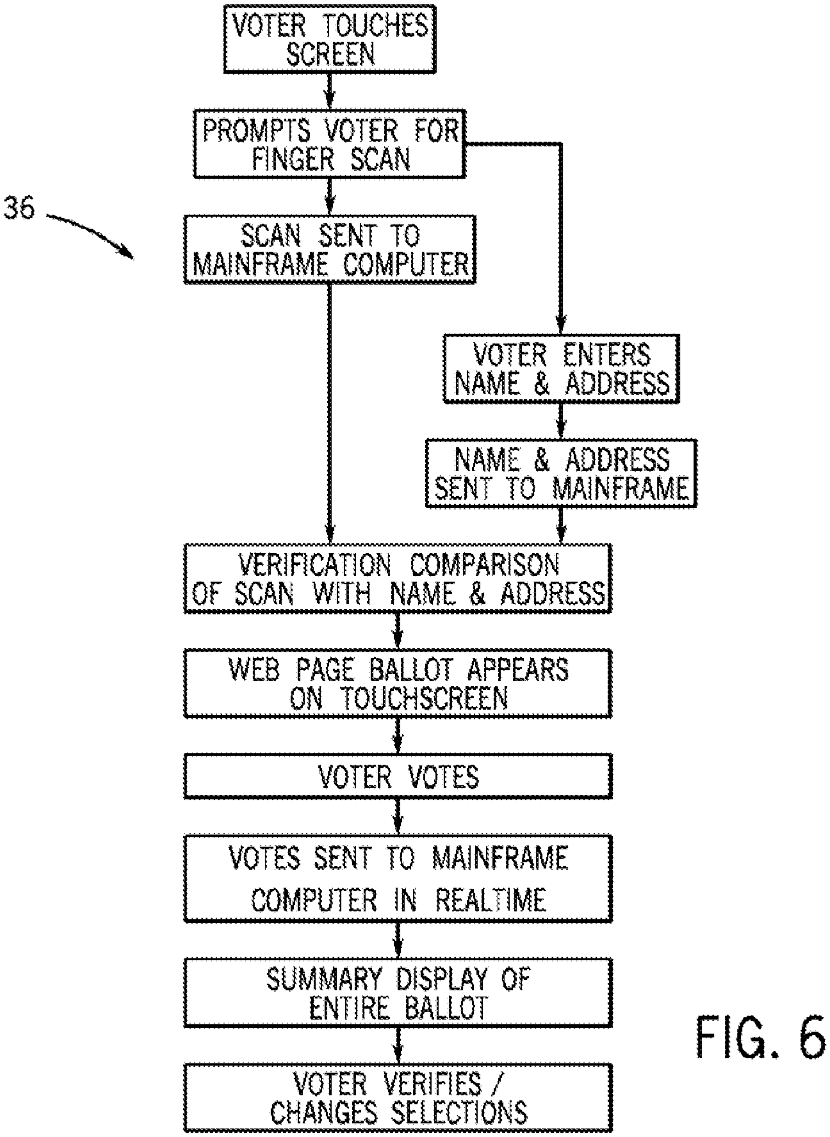
FIG. 6 is a flow chart of an embodiment of a voting system according to the present invention.

As depicted in the flowchart of FIG. 6, to vote on an embodiment of the system, a voter walks up to any open terminal and initiates a voting session by touching the screen 16. This is the preferred method when the terminals are configured with a touch screen 16 as the voter controlled input device. Alternate embodiments may have an additional attached input device, such as a keyboard (not shown). The voter then receives a visual prompt on the display screen, from the mainframe computer, to place their index finger on the biometric finger scanning input device 18. The finger scan is sent back to the Supervisor of Elections (SOE) mainframe which then searches its database records for a match comparing it to all the other finger scans on record. While searching for a match, the mainframe computer sends the voter an electronic image of an on-screen keyboard. The voter is asked by the mainframe to use the onscreen keyboard to enter their correct name and address. The SOE mainframe system verifies the name and address with those found on record from the finger scan match. It then presents the voter with a copy of the correct web page ballot(s) for that voters' party affiliation, language, precinct, district, city, etc., that the voter resides in, for them to vote on. Ballot layout and designs may or may not be determined by local or state laws, and or the County SOE office.

In an embodiment, the voter makes selections on the touch screen for each issue. Write-in selections may be done via an on screen keyboard. Selections are transmitted in real time back to the SOE mainframe. No votes are kept in or stored in any of the voting terminals. If any items on a ballot page are left blank the voter receives a pop up message window on the display screen. In this pop up window the voter must confirm that it is their intention to leave some items blank before they are allowed to go on to the next page. After the voter has been presented with all appropriate ballot pages and has indicated his or her selections, they are then presented with a final summary screen(s) that shows all selections, blanks, etc., for all issues. Before casting a ballot the voter receives a final option to change/correct or leave it blank. After making final selections the voter receives a final pop up warning about any blank items still left on the ballot at which time the voter must indicate, in this pop up window, that it is their intention to leave them blank. To cast their ballot the voter receives a second prompt (not shown) to place their finger on the biometric finger scanning input device. The second scan is sent back to the mainframe which compares it with the voters first finger scan. The two scans must match to successfully cast a ballot. The mainframe then saves the voters selections in that voters personal database record and then sends back a "Thank You for Voting, your vote has been counted," or a similar type acknowledgement message to the voter (not shown). Any interruption in this voting process such as a power outage or data communications error, prior to the mainframe recording the voters' ballot, results in no change in the voters' voting record. It is as if they haven't yet voted and are free to do so at any time. This feature of the system protects the voter and their right to vote in the event that there is any kind of interruption in the electronic voting process before it can be completed.

In an embodiment, the internal electrical components can be housed in any number of different case/terminal designs based on size, function, use, and portability. It can incorporate different internal components for different options and various screen sizes for different functions/results. Such flexibility of design will allow anyone skilled in the art to maximize functionality and usability for their specific device. However it is built and configured, whatever components are used its underlying basic function is to allow a biometric personally secure identification method whereby an individual can use this method, as a unique key, to lock and unlock access to only his or her own individual confidential personal database record information via the same biometric ID access method. Any agency or business with a large or ever growing database of individual confidential personal information and records such as doctors, lawyers, hospitals, law enforcement agencies, insurance companies, state, local and federal government agencies, and more, could utilize a system such as this to allow only each individual to lock or unlock any such access to their confidential database record of personal information. Embodiments will focus primarily on the use of this system as a computerized electronic voting system.

Embodiments provide an electronic voting system. The invention is not limited in scope to only this use. The uses mentioned herein are provided to illustrate a very few specific uses and are not intended to convey only these few uses. They are meant to convey the broad range and scope of the many possibilities of use to those skilled in the art. Indeed many different uses, besides those few mentioned herein, may come to mind to anyone skilled in the art. Many different forms of design and functional use will come to mind of anyone skilled in the art. Indeed many other possible variations and modifications of physical size and functional use should not be limited to only those listed herein. Many such alternative forms of physical design and functional use will pertain to this invention and are intended to be covered by this disclosure, the illustrative drawings and the numerous claims mentioned herein.

In an embodiment, each voter registers with a unique voter specific biometric key used to lock and unlock access to only their record. The preferred biometric key for this invention is a finger scan. When the voter registers and presents a finger scan the mainframe computer searches its database record of all other finger scans comparing each voter's finger scan to all others in the system. SOE personnel then process each voter accordingly. Due to the design of the database, any SOE database searches by SOE personnel will only display a voters name, address and precinct number. The database is structured this way in order to protect the integrity of the secret ballot and to keep confidential all voter specific information (VSI) and all individual voting records. Each voter must unlock his/her record to allow any such SOE access in order to view, print or change any VSI information.

In an embodiment, voting records cannot be viewed by SOE personnel or changed by anyone after an election is closed. Each voter presents their biometric key, in this case a finger scan, to vote on any active voting terminal. Because of the database structure and the centralized location of the mainframe computer, voting can be done on any voting terminal anywhere. Voters are no longer restricted to having to vote in a specific assigned location or precinct.

An embodiment of the system is also Help America Vote Act (HAVA) compliant with an audio ballot feature. This can be accomplished any number of ways. The preferred method is with the voter listening on headphones attached to an audio voting station. Voting is conducted by each voter listening to prerecorded MP3 or other suitable audio wave files of the entire ballot with suitable pauses and audio prompts with the voter indicating their selections by touching the screen anywhere using the touch screen like a giant yes/no button to make their selections known to the system. Voter selections are transmitted to the mainframe, recorded and an acknowledgement is then transmitted back to the voter via an audio response system that the voter hears in the headphones.

Each total election record, of all votes cast, becomes a permanent read only record of votes locked into the mainframe database record once the polls close and all eligible voters have voted with the mainframe storing a complete record of the election in all copies of the database. Once a voting record is locked by the SOE it can only be read and never changed or modified in any way.

The county can also generate revenue by charging and collecting fees for database searches of demographic and voting records. The collecting of any such fees would generate a revenue stream for the county. Due to the design of the database structure all demographic and voting record information is not specifically connected to each individual voter and as such is not VSI information. Therefore the integrity of the secret ballot is maintained.

An embodiment of an electronic voting system addresses existing short comings in the following ways. First of all the database design of voter registration, demographic and voting record information allows the system to function as described herein. Any such database of individual personal information records can be structured this way. This allows only the individual presenting their biometric 'key' to lock and unlock access to only their record of information. This is the preferred method of storing and accessing personal database information for the electronic voting system.

In an embodiment, each individual voter's record is structured like a pyramid. The top most level is the voters' name, address and city, which determines their corresponding voting precinct number. The next level down is that voter's biometric ID key. It can be a finger print, a finger scan, a retinal scan, a voice print, a series of security questions and voter supplied answers or any combination of these and or others. The preferred method used for this invention is a finger scan with further security hashing steps implemented by the mainframe. It is as unique an ID method to the individual as a finger print. However it is not a finger print and the finger scan cannot be reverse engineered to produce the finger print that generated it. This is a secure database ID system for the voting system. This finger scan ID key locks and unlocks the individuals name and address information to the pyramid of database records below it.

The next level down in an embodiment of the pyramid record is Voter Specific Information (VSI). This is personal information about that voter listed above it. Information such as but not limited to the following: age, date of birth, race, national origin, nationality, party affiliation, voting handicaps, language, citizenship status, convicted felon, etc. This is personal information required by the SOE office in order for that person to be legally registered to vote. Below this level of personal information are multiple separate layers of voting records, one for each election, for every past election conducted using an embodiment. One layer for each election held that the voter voted in or not. The pyramid database of information grows from the bottom downward. For every subsequent election a new layer is added to the bottom of the previous layers.

When the individual voter presents their biometric 'key' their demographic and voting records become directly connected to the voters' name. This makes all such information Voter Specific Information (VSI) and as such viewable by only the voter to verify their votes as cast or SOE personnel to assist with changes to only the demographic portion of that information. This may allow each voter the opportunity to see and verify their votes as cast while at the same time it also protects the confidentiality and integrity of the secret ballot system.

In an embodiment of a voting system there are no internal ballots to load or program into each and every terminal or to activate at the time of voting for each and every voter. Ballots are web based like internet web pages. The content and format must follow SOE, State and local guidelines for layout and content. They are programmed and loaded into the mainframe computer at the SOE central location.

An embodiment of the voting system allows for last minute changes of any ballot page right up to whenever voting actually starts and the local laws allow for. Any ballot changes are made to a master web page ballot on the SOE mainframe computer.

With an embodiment of a voting system there need not be any more dead candidates on the ballot because it was too late to change the wording. With an embodiment of a voting system there need not be any more withdrawn candidates on the ballot. With an embodiment of a voting system there need not be any more votes mistakenly cast. With an embodiment of a voting system there need not be any more "yes" to vote no or "no" to vote yes confusion because it is too late to change the wording of ballot issues.

An embodiment of a voting system is multi-language capable. Foreign language web pages can be designed as necessary for each and every foreign language as required.

Because ballots are controlled and transmitted from the central mainframe computer, with an embodiment only one ballot design is necessary for each language allowed for any national, state, county, district/precinct, or city/municipality elections.

An embodiment of a voting system is HAVA compliant with special audio feature terminals.

With an embodiment of the database design the correct precinct specific ballot, in the appropriate voters' language, is transmitted to each individual voter to vote on. Because of this capability voters are no longer restricted to voting in a specific location or precinct. This helps prevent voting in the wrong precinct, sending voters to a different precinct to vote, and last minute voters turned away because they came to the wrong precinct to vote. Any voter can vote anywhere on any terminal.

Embodiments of voting terminals can go anywhere. They are no longer precinct specific.

With an embodiment of a voting system no internal votes are stored in the terminals. Voting and vote recording is done in real time on the mainframe computer. Because of this there are no internal votes or vote totals in each terminal to download or copy to another device and transmit or transport to the central SOE office.

With an embodiment of a voting system there is no need for any more voting terminal security seals. Special tracking numbers are no longer necessary.

With an embodiment of a voting system there are no internal printers in each terminal to jam or malfunction. There are no recurring costs for ink, ribbons, paper or other internal printers, printer supplies or printer parts.

With an embodiment of a voting system multiple voting by a voter is not possible. The database design associates each individual voter to their own individual electronic ballot: "one person—one ballot—one vote."

With an embodiment of a voting system it is possible for each and every voter to revote and change their vote, as local election laws allow for, again and again until the polls close. Each individual's ballot is tied to one and only one voter.

With an embodiment of a voting system this ballot to voter relationship allows the SOE the capability to trace each and every vote back to the individual voter that cast it with complete integrity of the secret ballot system. This capability allows each voter to check and verify only their own individual vote.

With an embodiment of a voting system the individual voting record is locked by the voter with their unique biometric key. A voting location, date, time stamp, and terminal number are also locked in each time a vote is cast.

With an embodiment of a voting system the complete voting record is locked permanently by the SOE when the polls close and the last voter has voted. There is no longer the need for printing hundreds of thousands of paper, absentee, provisional or optical scan ballots. There are no more printing errors on any ballots because there are no more printed ballots for either regular or absentee voting. Consequently there are no more incorrectly worded ballots mailed out. There are no more mis-mailed blank or incorrect ballots. There are no more postage, handling or print costs associated with paper or absentee ballots. There are no more last minute rush mass mailings. There are no more handling, sorting, processing, validating, hand counting, double counting etc. or storing of absentee ballots. There are no more lost or misplaced absentee ballots. There are no more uncounted absentee ballots.

An embodiment of a voting system allows for secure absentee voting via the internet. This capability enables overseas and military voting. There are many possible ways for absentee voters to vote. With an embodiment of the electronic voting system the preferred method for absentee voters to vote is as follows. Voters are mailed an authorization card with a security number generated from their unique biometric finger scan in order to login and vote. Absentee voter's login into a secure website. The voter must then enter their name and address and any additional security information required to verify their ID or answer a pre determined number of security questions. Absentee voters vote on the same web page ballots as the polling place voters do. They click a mouse on their selections and cast their ballot with a final security question.

In an embodiment, because of the biometric database design there is no more waiting in line at precincts or polling places to check voters picture ID's or signatures. ID verification is done in the mainframe computer real-time before each voter votes.

An embodiment of a voting system also has a paper trail feature. Even though there are no printers in any terminals or any sort of paper ballots whatsoever. This is accomplished in the following way. After a voter casts their ballot they can go to the SOE clerks on site in each voting center and request a printed copy. The clerk asks the voter to step up to a voting terminal and unlock their record with a biometric finger scan just like they did to vote. When the voter unlocks their voting record it is disconnected from the database and connected to their name. It now becomes voter specific information (VSI) directly connected to the voter's name. This direct connection to the voters' name allows only the voter to see their voting record. The SOE clerk cannot see the voting record. Thus the database design and biometric key access insure the integrity of the secret ballot and protects all voters voting records whenever the record is unlocked by the voter. The voter can verify their votes on the screen and select a "Print" option for a printed copy if they want a printed paper record to take with them. Finally a "Done" or "Exit" option locks their voting record back into the database and clears the terminal screen. A timeout feature automatically clears the screen and locks the record if the voter forgets to do so. This allows the voter to check and verify their vote and also allows the SOE to generate a paper vote trail for manual recounts or audit purposes.

In an embodiment, a paper trail audit and or full paper based recount is possible. The SOE office prints out the complete record of all votes cast in an election by precinct, city, district or county. Each and every individual vote, as cast, gets printed from the demographic database voting record for a particular election or candidate. It is not necessary for each voter to unlock their record to do this. Because each vote is not VSI connected to a unique voters' name the confidentiality of the secret ballot is maintained. The votes can then be hand counted or counted by machine or with optical scanners or as dictated by law, whichever method the SOE decides to use.

With an embodiment of a voting system there is no longer a need to cancel any electronic ballots. If the voter makes a mistake and casts a ballot in error all they need to do is initiate another voting session and correct or change their ballot.

With an embodiment of a voting system write in votes are possible using an on screen touch screen keyboard.

An embodiment of a voting system also captures voters' intent even if they want to cast a partial or fully blank ballot. This may help prevent under votes and guessing at the voters' intent.

With an embodiment of a voting system election recounts, either court ordered, automatic or those mandated by law, can be conducted in the exact same way as the original count was taken.

With an embodiment of a voting system you can audit terminal usage by each unique machine MAC address.

An embodiment of the database system allows you to automatically track heavily used terminals. This allows the SOE to rotate terminals to more evenly distribute their use. Problem terminals can be locked out at the mainframe.

The two front legs 14 when collapsed and folded up inside the bottom of the case become two integrated carrying handles.

The compact storage cases have an interlocking feature when stacked one on top of another to eliminate sliding and tipping when stacked for shipping or storage.

The new database design will allow the county SOE office to correct and clear up erroneous voter information presently stored in their voter registration data base. This will lead to more accurate and timely voter records.

An embodiment of a voting system can restore voter trust in the voting system. Voters will be able to see for themselves that their votes have been accurately recorded and counted and that only they, and no one else, can verify the accuracy and content of their own voting record.

Last minute voter initiated changes to their VSI information are possible.

Each voter can initiate corrections and or changes to their VSI record before or during an election. With the aid of SOE personnel a voter can unlock access to their VSI information to allow SOE personnel to make changes and or corrections such as a change of address.

Because of the database design and each voter's biometric key, picture ID's, presented at the polling places in order to vote, are no longer necessary.

With an embodiment you no longer have to mail out a voter registration card to each voter.

FIG. 1 shows the invention closed up inside the carrying case and stacked atop a second case. Note the recessed lip around the perimeter of the top which fits into a matching recessed area on the bottom of another case.

FIG. 2 shows the invention with its telescoping legs deployed. The two rear legs are angled out to the side for greater stability while the front legs, which form the two side carrying handles when folded up, are straight up and down. The AC power cord comes out the back and the lid is shown partially opened from the front and hinged at the back.

FIG. 3 is looking down inside the case with the lid fully removed for clarity sake. This figure shows the internal devices located inside the case. The case itself 12, The touch screen voting terminal 16, AC outlet and power switch 18, Biometric finger scanner 22, AC 24 and DC 26 power good indicator lights and the AC power cord 20. The relative positions are for illustrative purposes only and do not necessarily reflect the final engineering production positions of these devices.

FIG. 4 shows the voting terminal as it would look from the right side deployed for voting. The telescoping legs 14 support the carrying case 12. The touch screen voting terminal 16 can be set at two different viewing angles as illustrated here with the two privacy screens opened one to the left and one to the right. A third glare screen opens upward towards the top. The inside of the lid has positional stops that lock into the back of the touch screen terminal to securely hold it in place. The relative positions are for illustrative purposes only and do not necessarily reflect the final engineering production positions of these devices.

FIG. 5 is a block pictorial representation of the voting terminal, connected to the mainframe computer. It shows that the internal microprocessor controlled system board 28 connected to the touch screen display 16, the biometric finger scanner 18, and bootable operating system OS device 30 are connected to two of the available USB ports 29. The communications port 32 through which all data communications are sent back and forth to the mainframe computer 34 located at the SOE office. The names and relative positions are for illustrative purposes only and do not necessarily reflect the final engineering production names and positions of these devices.

FIG. 6 is a simple block diagram of the basic overall voting process and does not necessarily reflect all possible combinations of steps that could be covered in the complete voting process. They are for illustrative purposes only and do not necessarily reflect the final voting process.

It should be understood, of course, that the foregoing relates to exemplary embodiments of the invention and that modifications may be made without departing from the spirit and scope of the invention as set forth in the following claims.

I claim:

1. A method for changing a ballot, which comprises:

providing a computer database for storing a plurality of voter records, each of said voter records including voter information of a given voter, biometric information of the given voter, voter specific information of the given voter, and a ballot record containing a completed ballot of the voter;

providing a ballot database further including a plurality of different blank ballots; each of said plurality of voter records being related to one of said plurality of different blank ballots;

connecting a supervisor-of-elections computer terminal to said computer database;

inputting voter information of a voter in said supervisor-of-elections computer terminal;

transmitting said voter information to said computer database;

selecting a voter record from said plurality of voter records by matching said voter information of the voter with voter information a voter record in said computer database;

transmitting a blank voter ballot related to said voter record to a voting computer terminal;

inputting biometric information of the voter into said voting computer terminal;

generating biometric data from said biometric information;

casting a vote on said voter ballot by using said voting computer terminal to generate a completed replacement ballot;

transmitting said completed replacement ballot from said voting computer terminal to said computer database;

transmitting said biometric data from said voting computer terminal to said computer database;

providing write access in said computer database to said ballot record of said voter record of the voter when said biometric data transmitted from said voting computer terminal matches biometric data stored in said voter record of the voter; and writing said completed replacement ballot in said ballot record of said voter record of the voter.

2. The method according to claim 1, wherein said biometric information is a fingerprint of said voter.

3. The method according to claim 1, wherein said generating biometric data step includes performing a one-way function to generate said biometric data.

4. The method according to claim 1, wherein:

said biometric information is a digital scan of a finger of the voter; and said biometric data is a cryptographic hash created from the digital scan of the finger of the voter.

5. The method according to claim 1, which further comprises transmitting said voter specific information from said database to said voting computer terminal when said biometric data of said voter matches said biometric data in said database.

6. The method according to claim 5, which further comprises not transmitting said voter specific information to said supervisor-of-elections computer terminal.

7. The method according to claim 1, which further comprises locating said voting computer terminal at a precinct that is geographically different than the ballot being transmitted to said voting computer terminal.

8. The method according to claim 1, which further comprises writing ballot information to said database, said ballot information being related to said completed ballot, and said ballot information including at least one of a voting location identifying where said completed ballot was cast, a voting time identifying when said completed ballot was cast, and a voting computer terminal identification identifying said voting computer terminal from where said completed ballot was transmitted.

9. The method according to claim 1, which further comprises deleting said completed record from said ballot record of the voter in said computer database before writing said completed replacement ballot into said ballot record of the voter in said computer database.

* * * * *